United States Patent
Ikegami

(10) Patent No.: US 10,072,497 B2
(45) Date of Patent: Sep. 11, 2018

(54) DOWNHOLE ACOUSTIC WAVE SENSING WITH OPTICAL FIBER

(71) Applicant: Schlumberger Technology Corporation, Sugar Land, TX (US)

(72) Inventor: Toru Ikegami, Machida (JP)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 12 days.

(21) Appl. No.: 14/951,484

(22) Filed: Nov. 24, 2015

(65) Prior Publication Data

US 2016/0170082 A1 Jun. 16, 2016

Related U.S. Application Data

(60) Provisional application No. 62/091,643, filed on Dec. 15, 2014.

(51) Int. Cl.
| | |
|---|---|
| *G01H 9/00* | (2006.01) |
| *G01V 11/00* | (2006.01) |
| *E21B 47/12* | (2012.01) |

(52) U.S. Cl.
CPC .......... *E21B 47/123* (2013.01); *G01H 9/004* (2013.01); *G01V 2210/1429* (2013.01)

(58) Field of Classification Search
CPC ............... G01H 9/004; E21B 47/123; G01V 2210/1429
USPC ........................................ 367/25, 35
See application file for complete search history.

(56) References Cited

U.S. PATENT DOCUMENTS

| | | | |
|---|---|---|---|
| 4,443,698 A | 4/1984 | Schiffner | |
| 4,499,421 A * | 2/1985 | Sinclair | G01V 3/28 324/232 |
| 4,843,233 A | 6/1989 | Jeunhomme | |
| 5,563,967 A | 10/1996 | Haake | |
| 6,389,187 B1 | 5/2002 | Greenaway et al. | |
| 7,324,714 B1 | 1/2008 | Cranch et al. | |
| 7,379,631 B2 | 5/2008 | Poland et al. | |
| 7,586,617 B2 | 9/2009 | Hartog et al. | |
| 7,664,347 B2 | 2/2010 | Childers et al. | |
| 7,668,411 B2 | 2/2010 | Davies et al. | |

(Continued)

FOREIGN PATENT DOCUMENTS

WO 2013/090544 6/2013

OTHER PUBLICATIONS

Combined search and examination report for the equivalent UK patent application No. 1520940.6 dated Feb. 10, 2016.

(Continued)

*Primary Examiner* — Daniel L Murphy
(74) *Attorney, Agent, or Firm* — Sara K. M. Hinkley

(57) ABSTRACT

A technique facilitates geophysical exploration by employing a tool wrapped with an optical fiber. Additionally, an orientation sensor is coupled to the tool and is operable to provide data regarding orientation of the tool. A processing system, which may include an optical interrogation system, cooperates with the optical fiber and with the orientation sensor to obtain acoustic data. For example, the processing system collects tool orientation data and also strain data obtained from a location along the wrapped optical fiber. The strain data results from excitation of an acoustic signal from a suitable acoustic source.

13 Claims, 7 Drawing Sheets

(56) References Cited

U.S. PATENT DOCUMENTS

| | | |
|---|---|---|
| 7,772,541 B2 | 8/2010 | Froggatt et al. |
| 7,903,908 B2 | 3/2011 | MacDougall et al. |
| 8,265,431 B2 | 9/2012 | Childers et al. |
| 8,818,143 B2* | 8/2014 | Younge ............... A61B 5/1076 385/13 |
| 2011/0188344 A1 | 8/2011 | Hartog et al. |
| 2011/0292763 A1 | 12/2011 | Coates et al. |
| 2011/0320147 A1 | 12/2011 | Brady et al. |
| 2012/0046866 A1 | 2/2012 | Meyer et al. |
| 2012/0067118 A1 | 3/2012 | Hartog et al. |
| 2012/0257475 A1 | 10/2012 | Luscombe et al. |
| 2012/0323075 A1 | 12/2012 | Younge et al. |
| 2013/0091942 A1 | 4/2013 | Samson et al. |
| 2015/0075276 A1* | 3/2015 | Cooper ................ E21B 47/123 73/152.58 |
| 2017/0082766 A1 | 3/2017 | Milne et al. |

OTHER PUBLICATIONS

Examination report for the related GB application 1520940.6, dated Mar. 17, 2017 (3 pages).

Mizuno, Yosuke, et al., et al. "Proposal of Brillouin optical correlation-domain reflectometry (BOCDR)," Optics Express. 2008. vol. 16, 16, pp. 12148-12153.

* cited by examiner

FIG. 1     FIG. 2     FIG. 3
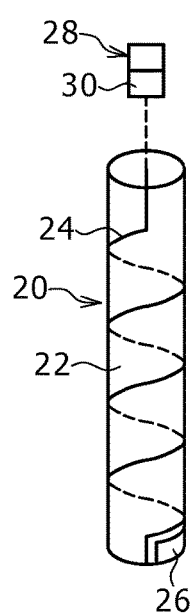 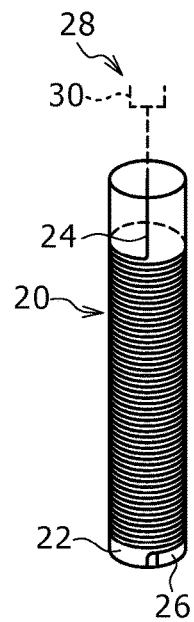 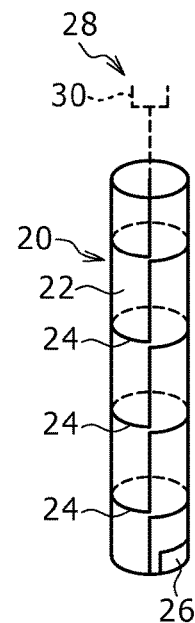
FIG. 4
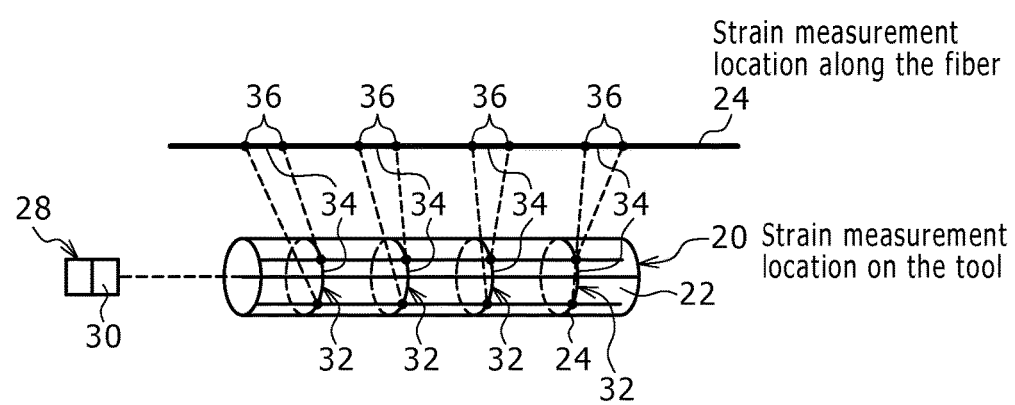

DOWNHOLE ACOUSTIC WAVE SENSING WITH OPTICAL FIBER

RELATED APPLICATIONS

This application claims the benefit of a related U.S. Provisional Application Ser. No. 62/091,643 filed Dec. 15, 2014, entitled "Downhole Acoustic Wave Sensing with Optical Fiber" to Toru IKEGAMI, the disclosure of which is incorporated by reference herein in its entirety.

BACKGROUND

Hydrocarbon fluids such as oil and natural gas are obtained from a subterranean geologic formation, referred to as a reservoir. Various forms of geophysical exploration are employed to better understand the location, size, and characteristics of the reservoir. For example, acoustic exploration techniques have been employed to facilitate an improved understanding of the reservoir. Some applications of such measurement would require the use of acoustic receivers which are oriented in a specific direction with respect to the earth coordinate system to obtain the desired data. Due to the difficulty in precisely controlling the azimuth direction of the tool, in other applications, conventional data obtained during acoustic exploration can be pre-processed to a form representative of data obtained with such oriented acoustic receivers.

SUMMARY

In general, a system and methodology are provided for facilitating geophysical exploration. A technique employs a tool wrapped with an optical fiber. Additionally, an orientation sensor is coupled to the tool and is operable to provide data regarding orientation of the tool. A processing system, which may include an optical interrogation system, cooperates with the optical fiber and with the orientation sensor to obtain acoustic data. For example, the processing system collects tool orientation data and also strain data obtained from a location along the wrapped optical fiber. The strain data results from excitation of a sonic signal from a suitable sonic source. The orientation data and strain data are combined and used in determining acoustic data indicative of characteristics of a geologic formation.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and:

FIG. 1 is a schematic illustration of an example of a tool wrapped with an optical fiber to facilitate geophysical exploration, according to an embodiment of the disclosure;

FIG. 2 is a schematic illustration of another example of a tool wrapped with an optical fiber to facilitate geophysical exploration, according to an embodiment of the disclosure;

FIG. 3 is a schematic illustration of another example of a tool wrapped with an optical fiber to facilitate geophysical exploration, according to an embodiment of the disclosure;

FIG. 4 is a schematic illustration of an example of a tool wrapped with at least one optical fiber having a strain measurement location along the fiber, according to an embodiment of the disclosure;

DETAILED DESCRIPTION

Figure 5:
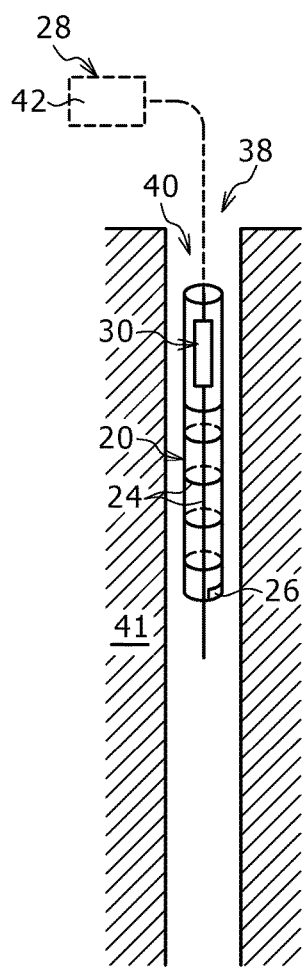
FIG. 5 is a schematic illustration of an example of an acoustic measurement system having an embodiment of the tool positioned in a wellbore, according to an embodiment of the disclosure.

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The disclosure herein generally involves a system and methodology which facilitate geophysical exploration, e.g. acoustic geophysical exploration. The technique employs a tool wrapped with an optical fiber. Additionally, the orientation of the tool in, for example, a borehole is monitored by an orientation sensor. Data from the orientation sensor is sent to a processing system which also receives data from the optical fiber. For example, the processing system may include an optical interrogation system which cooperates with the optical fiber to obtain strain data related to acoustic signals. In some applications, the optical interrogation system may be located downhole while the remainder of the processing system is located at a surface location or other suitable location.

In operation, the processing system collects tool orientation data and also strain data obtained from a specific location along the wrapped optical fiber. The strain data occurs in the optical fiber following excitation of an acoustic signal from a suitable sonic source. By combining the orientation data and the strain data via the processing system, various types of information may be determined regarding characteristics of a surrounding geologic formation.

According to an embodiment, a methodology is provided for recording acoustic and/or elastic waves using optical fiber with downhole tools. During downhole geophysical exploration, elastic properties of an underground formation can be obtained through measurement of the acoustic field in a well and/or measurement of the motion of the borehole wall. Measurement of the acoustic field may be made by, for example, sonic logging tools, and measurement of the motion of the borehole wall may be made by, for example, borehole seismic tools. Examples of elastic properties of the underground formation include velocities of elastic waves, stratification of the formation observed as a contrast of the acoustic impedance, and permeability.

In certain acoustic measurement applications, e.g. sonic logging or seismic measurement with hydrophones, methods were applied to synthesize oriented data from the acoustic field around a downhole tool sampled with azimuthally distributed acoustic sensors. However, a large number of acoustic sensors was employed and the numerous sensors tended to introduce substantial complexity into the hardware design. The large number of sensors also increased the amount of data to be handled, thus leading to longer operation times due to limitations in telemetry data rates. The large amount of data further imposed limits on the maximum logging interval with respect to the downhole tools that store the data into memory, e.g. logging-while-drilling tools. In these types of applications, the turnaround time was relatively long because the preprocessing or conversion of data to oriented data was not performed in real time.

However, the embodiments described herein remove these limitations. As described in greater detail below, a system and methodology are provided to measure local strain in an arbitrary location of an optical fiber with resolution on the order of centimeters. A variety of techniques may be used to obtain data via the optical fiber. For example, a Brillouin Optical Coherence Domain Reflectometry technique may be employed.

Referring generally to FIG. 1, a tool 20, e.g. a downhole tool, is illustrated. By way of example, the tool 20 may comprise a wireline tool, a logging-while-drilling tool, a tubing conveyed permanent monitoring tool, or another suitable tool. In this example, the tool 20 comprises a tool body 22 on which an optical fiber 24 is wrapped. For example, the optical fiber 24 may be wrapped around the tool 20 along an exterior of the tool body 22. In some applications, the optical fiber 24 may be wrapped in a helical pattern around the tool 20, although various applications may utilize other types of wrap patterns.

In the example illustrated, an orientation sensor 26 is coupled with tool 20. In some applications, the orientation sensor 26 may be mounted to tool 20, e.g. mounted in or on tool 20. The orientation sensor 26 is used to measure the orientation of the tool 20 with respect to the earth coordinate system. By way of example, the orientation sensor 26 may comprise a gyroscope, gravity sensor, inclinometer, accelerometer, other suitable orientation sensors, or combinations of such sensors.

Additionally, a processing system 28 is coupled with both the optical fiber 24 and the orientation sensor 26 to obtain data for facilitating geophysical exploration by enhancing knowledge on, for example, a surrounding formation. The data may be obtained by processing system 28 in real time. In the example illustrated, the processing system 28 comprises an optical interrogation system 30 which is coupled with optical fiber 24 and may be used to send, receive, and analyze optical signals. The optical interrogation system 30 enables strain measurements to be made at a specific location or locations along the portion of optical fiber 24 which is wrapped around tool 20. In some applications, the optical interrogation system 30 may be used to obtain measurements of strain caused by the acoustic field at arbitrary locations along fiber 24 as a time series signal. By way of example, the optical interrogation system 30 may employ interlaced scanning to obtain the strain measurements. Depending on the application, the optical interrogation system 30 may reside in the tool body 22, in a separate downhole module, or at a surface location.

Depending on the application, the optical fiber 24 may have various forms and configurations. By way of example, the optical fiber 24 may be helically wrapped around tool 20 with relatively large spacing, as illustrated in FIG. 1, or with relatively tight spacing and a larger number of wraps, as illustrated in FIG. 2. In some applications, a fiber 24 may be wrapped around the tool 20 but configured in a stair-step manner as illustrated in FIG. 3, so that the wraps are primarily in individual planes orthogonal to the axis of the tool and spaced either incrementally (as shown) or in clusters about a particular area. Of course, combinations of wrapping may also be used, such as having tight spacing and larger numbers of wraps from FIG. 2 substituted for the individual wrapping of the fiber in FIG. 3. The number of wrappings per band does not have to be the identical and may be selected with regards to desired levels of sensitivity or measurement ability along the body 22 of the tool. In some embodiments, a plurality of optical fibers may be used.

Referring generally to FIG. 4, an illustration of tool 20 is provided to show the relationship between specific locations 32 of strain on the tool 20 and the corresponding specific locations 34 selected for strain measurement along the optical fiber 24. The strain in tool 20, and thus in optical fiber 24, occurs as a result of acoustic signals, e.g. the acoustic field, acting on tool 20. By selecting an appropriate section(s)/location(s) 34 along optical fiber 24, the strain at an arbitrary azimuth direction (e.g. see points 36 in FIG. 4) on the tool 20 can be measured.

Figure 6:
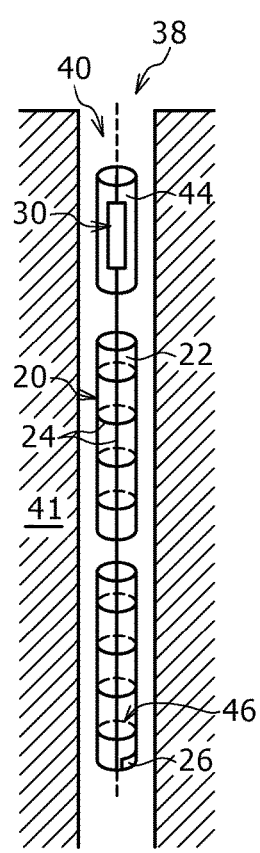
FIG. 6 is a schematic illustration of another example of an acoustic measurement system having an embodiment of the tool positioned in a wellbore, according to an embodiment of the disclosure.
Figure 7:
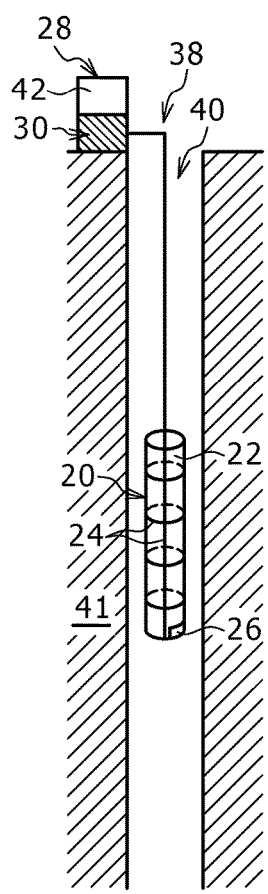
FIG. 7 is a schematic illustration of another example of an acoustic measurement system having an embodiment of the tool positioned in a wellbore, according to an embodiment of the disclosure.

Referring generally to FIGS. 5-7, embodiments of an overall measurement system 38 for facilitating geophysical exploration are illustrated. In the example illustrated in FIG. 5, tool 20 comprises a well tool disposed at a subterranean location in a wellbore 40 drilled into a formation 41. Additionally, the tool 20 includes both orientation sensor 26 and optical interrogation system 30. The orientation sensor 26 and optical interrogation system 30 may be communicatively coupled with, for example, a surface data processing unit 42 which forms part of the overall processing system 28. In this example, the tool 20 may be conveyed downhole along wellbore 40 to a desired downhole location via a suitable conveyance, such as a wireline, coiled tubing, or other type of conveyance.

In FIG. 6, another embodiment is illustrated in which the optical interrogation system 30 is positioned downhole in wellbore 40 at a location separate from tool 20. For example, the optical interrogation system 30 may be positioned in a separate module 44 which is communicatively coupled with optical fiber 24 and tool 20. Similarly, the orientation sensor 26 may be located separately from tool 20 and may be positioned in another tool or component 46 associated with tool 20. The tool 20, module 44, and component 46 may be conveyed downhole into wellbore 40 via a suitable conveyance or conveyances.

As illustrated in FIG. 7, another embodiment of system 38 positions the optical interrogation system 30 at a surface location. The surface location may be at the well site or at another suitable surface location which allows the optical interrogation system 30 to be in communication with the optical fiber 24 of tool 20. In the example illustrated, orientation sensor 26 is mounted to tool 20, however the orientation sensor 26 also can be mounted to another tool/component associated with tool 20.

The data provided by orientation sensor 26 and optical fiber 24 are combined to provide oriented data. The oriented data is indicative of (or may be converted to a form indicative of) characteristics of formation 41, and that data may be output, e.g. displayed, for a user via processing system 28/42. However, the overall system 38 may be used according to various methods and in various configurations to obtain the oriented data. Generally, the methodologies fall into at least two categories. For example, embodiments may comprise methodologies in which the tool system 38 has electrical and/or optical communication between tool 20 located downhole and processing system 28/42 located at the surface. Other embodiments comprise methodologies in which the tool system 38 has limited communication between tool 20 located downhole and processing system 28/42 located at the surface. Examples of both types of methodologies are provided in the flowcharts illustrated in FIGS. 8-12.

Figure 8:
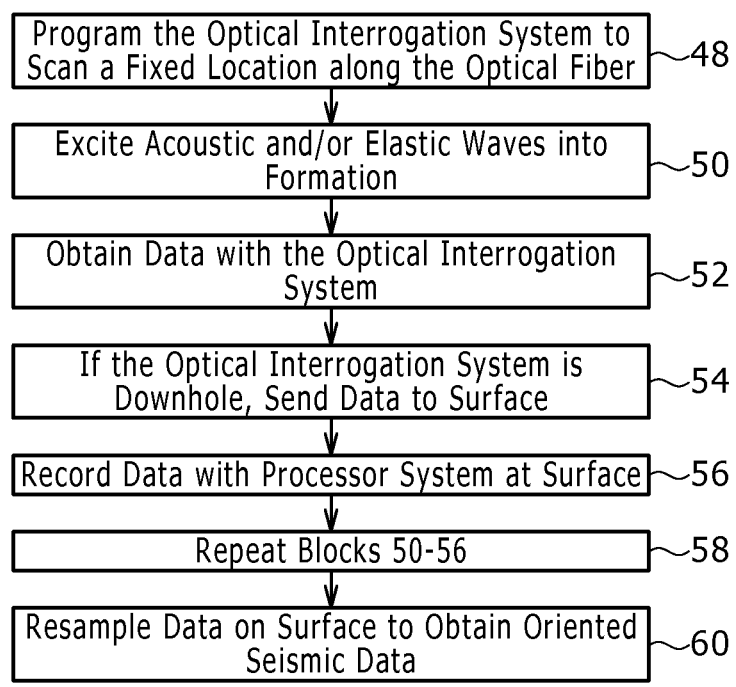
FIG. 8 is a flowchart illustrating an example of a procedure for utilizing the tool in a geophysical exploration operation, according to an embodiment of the disclosure.

Referring generally to FIG. 8, an example of a methodology for utilizing measurement system 38 and tool 20 is illustrated. In this example, strain data is obtained at fixed locations 34 along optical fiber 24. Initially, the optical interrogation system 30 is programmed to scan a fixed location or locations 34 along the optical fiber 24, as represented by block 48 in the flowchart of FIG. 8. A suitable acoustic source or sources is then operated to excite acoustic and/or elastic waves into formation 41, as represented by block 50. As the fixed locations 32 on tool body 22 and the corresponding fixed locations 34 along optical fiber 24 are affected by the acoustic and/or elastic waves, strain is measured by the optical fiber 24 at these fixed locations. This allows the optical interrogation system 30 to obtain strain data, as represented by block 52.

If the optical interrogation system 30 is located downhole in wellbore 40, the strain data is sent to the surface, e.g. sent to surface data processing system 42, as represented by block 54. The orientation data from orientation sensor 26 also may be sent to the surface data processing system 42; and the strain data and orientation data may be recorded and stored by processing system 42, as represented by block 56. The elements of this methodology set forth in blocks 50, 52, 54 and 56 may be repeated a desired number of times, as represented by block 58. This allows the collected data to be resampled on the surface to obtain oriented acoustic data based on the strain data and the orientation data, as represented by block 60.

Figure 9:
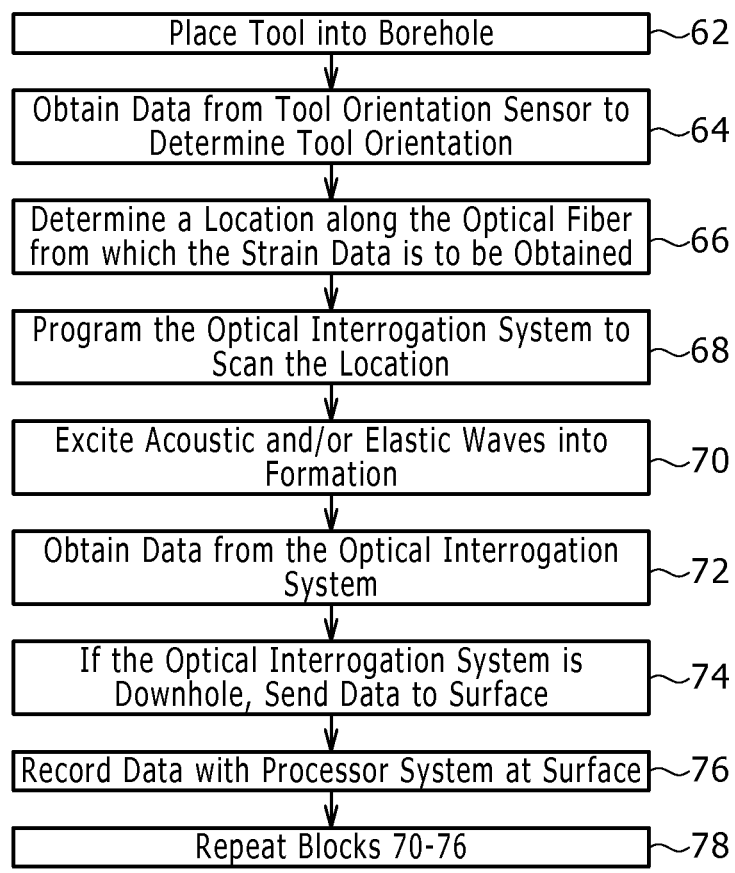
FIG. 9 is a flowchart illustrating another example of a procedure for utilizing the tool in a geophysical exploration operation, according to an embodiment of the disclosure.

Referring generally to FIG. 9, another example of a methodology for utilizing measurement system 38 and tool 20 is illustrated. In this example, strain data is obtained at fixed locations 34 along optical fiber 24 that correspond to certain directions with respect to the earth coordinate system. This type of methodology may include, but is not limited to, a time-lapse acoustic measurement with a permanently installed tool 20. In this example, the tool 20 is initially placed downhole into the borehole, e.g. into wellbore 40, as represented by block 62.

Data is then obtained from the tool orientation sensor 26 to determine the orientation of tool 20, as represented by block 64. Additionally, a location or locations 34 may be determined along optical fiber 24 from which the strain data is to be obtained, as represented by block 66. The optical interrogation system 30 is programmed to scan the selected location or locations 34 along the optical fiber 24, as represented by block 68. A suitable acoustic source or sources is operated to excite acoustic and/or elastic waves into formation 41, as represented by block 70. As the selected locations 34 along optical fiber 24 are affected by the acoustic and/or elastic waves, strain is measured by the optical fiber 24 at these fixed locations. This allows the optical interrogation system 30 to obtain strain data, as represented by block 72.

If the optical interrogation system 30 is located downhole in wellbore 40, the strain data is sent to the surface, e.g. sent to surface data processing system 42, as represented by block 74. The orientation data from orientation sensor 26 also may be sent to the surface data processing system 42; and the strain data and orientation data may be recorded and stored by processing system 42, as represented by block 76. The elements of this methodology set forth in blocks 70, 72, 74, and 76 may be repeated a desired number of times, as represented by block 78. Again, the collected data may be processed to determine desired, oriented acoustic data indicative of characteristics of formation 41 or other desired characteristics.

Figure 10:
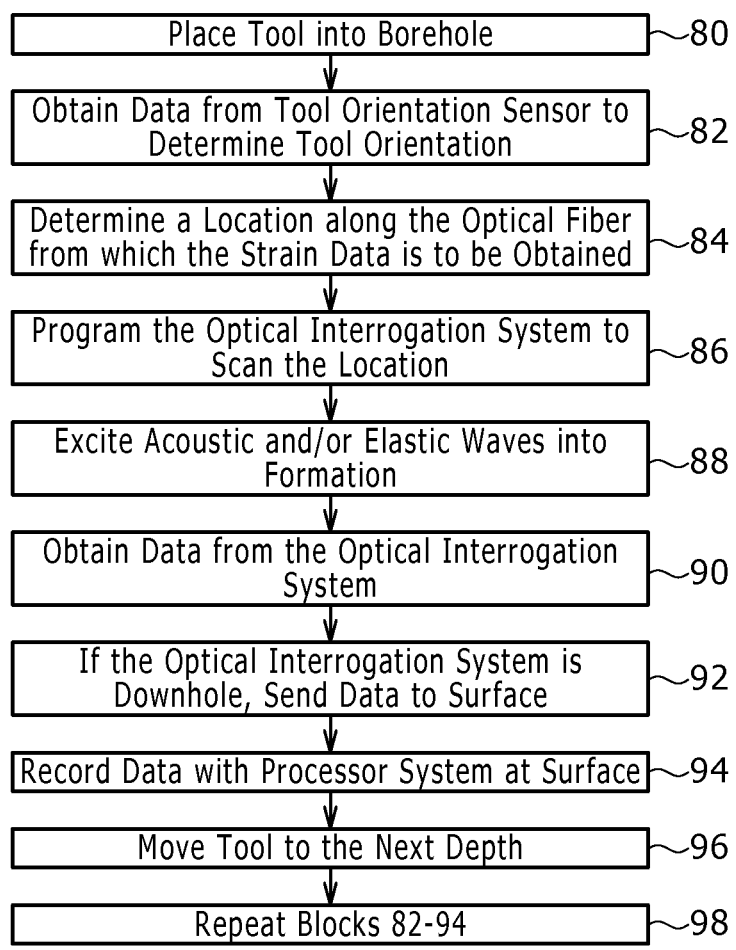
FIG. 10 is a flowchart illustrating another example of a procedure for utilizing the tool in a geophysical exploration operation, according to an embodiment of the disclosure.

Referring generally to FIG. 10, another example of a methodology for utilizing measurement system 38 and tool 20 is illustrated. In this example, strain data is obtained at dynamically varying locations of the optical fiber 24 that correspond to certain directions with respect to the earth coordinate system. This approach enables orientation of the data regardless of the orientation of the tool 20 in the borehole. In this example, the tool 20 is initially placed downhole into the borehole, e.g. into wellbore 40, as represented by block 80.

Data is then obtained from the tool orientation sensor 26 to determine the orientation of tool 20, as represented by block 82. Additionally, a location or locations 34 may be determined along optical fiber 24 from which the strain data is to be obtained, as represented by block 84. The optical interrogation system 30 is programmed to scan the location or locations 34 along the optical fiber 24, as represented by block 86. Additionally, a suitable acoustic source or sources is operated to excite acoustic and/or elastic waves into formation 41, as represented by block 88. As the locations 34 along optical fiber 24 are affected by the acoustic and/or elastic waves, strain is measured by the optical fiber 24 at these locations 34. This allows the optical interrogation system 30 to obtain strain data, as represented by block 90.

If the optical interrogation system 30 is located downhole in wellbore 40, the strain data is sent to the surface, e.g. sent to surface data processing system 42, as represented by block 92. The orientation data from orientation sensor 26 also may be sent to the surface data processing system 42; and the strain data and orientation data may be recorded and stored by processing system 42, as represented by block 94. The tool 20 is then moved to a next selected depth along wellbore 40, as represented by block 96. Elements of this methodology set forth in blocks 82, 84, 86, 88, 90, 92, 94 and 96 may then be repeated a desired number of times, as represented by block 98. The collected data may be processed to determine desired, oriented acoustic data indicative of characteristics of formation 41 or other desired characteristics at each wellbore depth.

Figure 11:
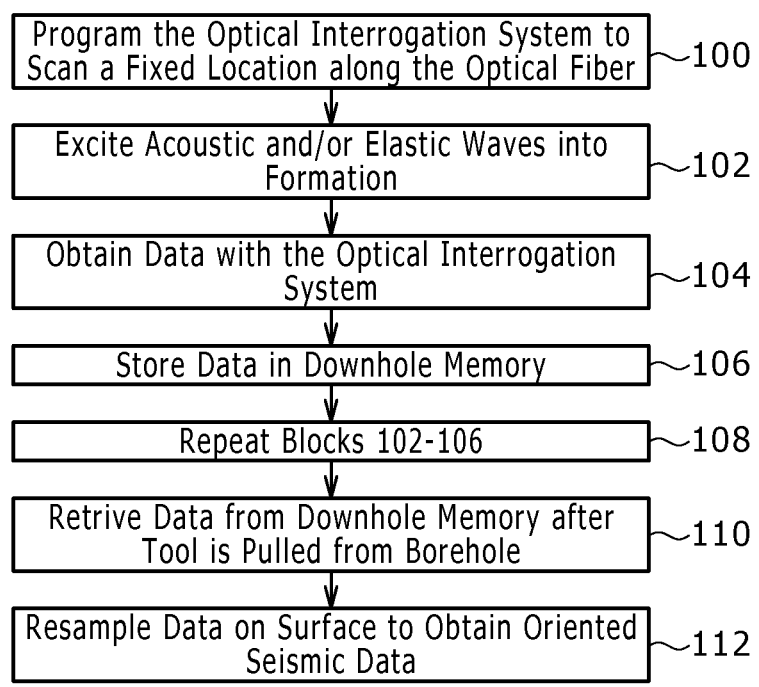
FIG. 11 is a flowchart illustrating another example of a procedure for utilizing the tool in a geophysical exploration operation, according to an embodiment of the disclosure.

Referring generally to FIG. 11, another example of a methodology for utilizing measurement system 38 and tool 20 is illustrated. In this example, measurement system 38 utilizes no communication or limited communication between tool 20 and a surface processing system while tool 20 is downhole. Strain data is obtained at fixed locations 34 along optical fiber 24. Initially, the optical interrogation system 30 is programmed to scan the fixed location or locations 34 along the optical fiber 24, as represented by block 100. A suitable acoustic source or sources is then operated to excite acoustic and/or elastic waves into formation 41, as represented by block 102. As the fixed locations 32 on tool body 22 and corresponding fixed locations 34 along optical fiber 24 are affected by the acoustic and/or elastic waves, strain is measured by the optical fiber 24 at these fixed locations. This allows the optical interrogation system 30 to obtain strain data, as represented by block 104.

The strain data obtained from optical fiber 24 and/or the orientation data obtained from orientation sensor 26 are then stored at a downhole location in, for example, a downhole memory of the optical interrogation system 30 or another suitable memory, as represented by block 106. The elements of the methodology represented by blocks 102, 104, and 106 may then be repeated a desired number of times, as represented by block 108. The data may be retrieved from the downhole memory after tool 20 is pulled from the borehole, e.g. pulled from wellbore 40, as represented by block 110. The data collected from the downhole memory may be resampled on the surface via, for example, surface processor 42 to obtain oriented acoustic data based on the strain data and the orientation data, as represented by block 112.

Figure 12:
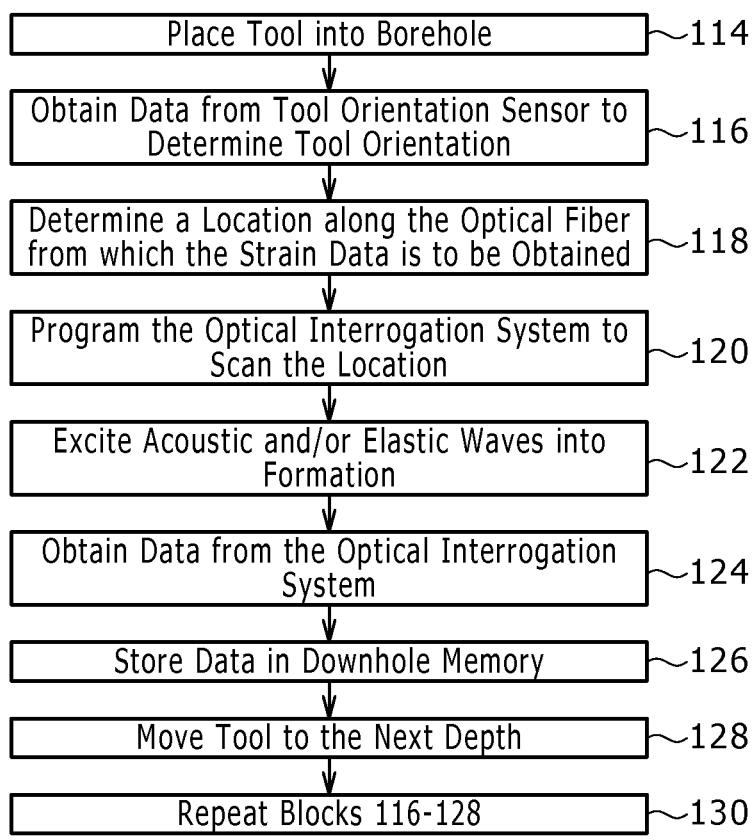
FIG. 12 is a flowchart illustrating another example of a procedure for utilizing the tool in a geophysical exploration operation, according to an embodiment of the disclosure.

Referring generally to FIG. 12, another example of a methodology for utilizing measurement system 38 and tool 20 is illustrated. In this example, measurement system 38 again utilizes no communication or limited communication between tool 20 and a surface processing system, such as system 42 of overall processing system 28. Strain data is obtained at dynamically varying locations 34 along optical fiber 24 that correspond to certain directions with respect to the earth coordinate system. This approach enables orientation of the data regardless of the orientation of tool 20 in the borehole. In this example, the tool 20 is initially placed downhole into the borehole, e.g. into wellbore 40, as represented by block 114.

Data is then obtained from the tool orientation sensor 26 to determine the orientation of tool 20, as represented by block 116. Additionally, a location or locations 34 may be determined along optical fiber 24 from which the strain data is to be obtained, as represented by block 118. The optical interrogation system 30 is programmed to scan the location or locations 34 along the optical fiber 24, as represented by block 120. A suitable acoustic source or sources is operated to excite acoustic and/or elastic waves into formation 41, as represented by block 122. As the locations 34 along optical fiber 24 are affected by the acoustic and/or elastic waves, strain is measured by the optical fiber 24 at these fixed locations. This allows the optical interrogation system 30 to obtain strain data, as represented by block 124.

The strain data obtained from optical fiber 24 and/or the orientation data obtained from orientation sensor 26 are then stored at a downhole location in, for example, a downhole memory of the optical interrogation system 30 or another suitable memory, as represented by block 126. The tool 20 is then moved to another depth along wellbore 40, as represented by block 128. The elements of the methodology represented by blocks 116, 118, 120, 122, 124, 126 and 128 may then be repeated a desired number of times, as represented by block 130. The data may be retrieved from the downhole memory after tool 20 is pulled from the borehole, e.g. pulled from wellbore 40. The data collected from the downhole memory may be resampled on the surface via surface processing system 42 or another suitable processing system to obtain oriented acoustic data based on the strain data and the orientation data.

Depending on the specifics of a given application and/or environment, the procedure for obtaining acoustic data from the wraps of optical fiber 24 and/or from orientation sensor 26 may vary. Additionally, the configuration of the overall system 38, as well as the components of the overall system, may be adjusted to accommodate the parameters of a given procedure and/or environment. If data is transmitted uphole, various telemetry systems may be utilized for transmission of data uphole and/or downhole. Additionally, the processing system 28 may comprise a variety of individual or plural processors and may include a single processing unit or a plurality of processing units, e.g. a downhole processing unit and a surface processing unit. The collected data may be subjected to various available software, models, algorithms, and other processing techniques to obtain the desired, oriented acoustic data which can be used to determine various characteristics of the formation through which the acoustic signals pass to optical fiber 24.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A system for geophysical exploration, comprising:
a well tool wrapped with an optical fiber;
an orientation sensor coupled to the well tool to generate data on orientation of the well tool; and
an optical interrogation system coupled to the optical fiber, the optical interrogation system to scan at least one location along the optical fiber wrapped around the well tool to obtain strain data of the at least one location, the scanning of the at least one location along the optical fiber to be based on the data from the orientation sensor.

2. The system as recited in claim 1, wherein the well tool is wrapped helically with a single optical fiber.

3. The system as recited in claim 1, wherein the well tool is wrapped with a plurality of optical fibers.

4. The system as recited in claim 1, wherein the optical interrogation system is mounted to the well tool.

5. The system as recited in claim 1, wherein the optical interrogation system is positioned at a surface location.

6. The system as recited in claim 1, wherein the optical interrogation system is positioned at a downhole location.

7. The system as recited in claim 1, wherein the orientation sensor is mounted to the tool.

8. The system as recited in claim 1, wherein the tool is a first tool and the orientation sensor is carried by a second tool separately located from the first tool.

9. A method, comprising:
accessing orientation data indicative of an orientation of a tool positioned in a subterranean location, the tool wrapped with an optical fiber;
determining a location along a portion of the optical fiber to scan the optical fiber based on the orientation data;
scanning the location to obtain strain data from the location, the strain data to be generated in response to an acoustic signal excited into a formation surrounding the subterranean location; and processing the strain data and the orientation data to obtain oriented acoustic data.

10. The method as recited in claim 9, wherein the subterranean location is in a wellbore.

11. The method as recited in claim 9, further including initiating an orientation sensor coupled with the tool to generate the orientation data.

12. The method as recited in claim 9, wherein generating the strain data includes scanning the location.

13. The method as recited in claim 9, further comprising outputting data regarding characteristics of the formation.

* * * * *